Aug. 26, 1969    G. MARTIN    3,463,691
METHOD FOR FORMING LIQUID HEAT EXCHANGE PIPING SYSTEM
Original Filed Aug. 11, 1965
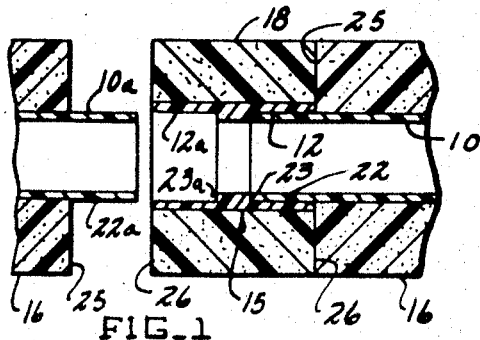
FIG_1
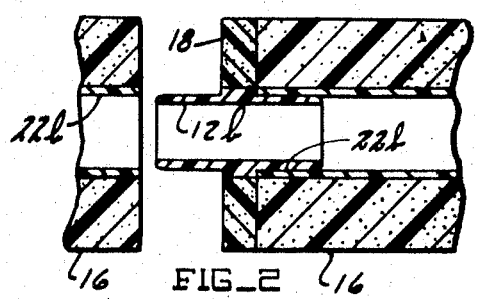
FIG_2
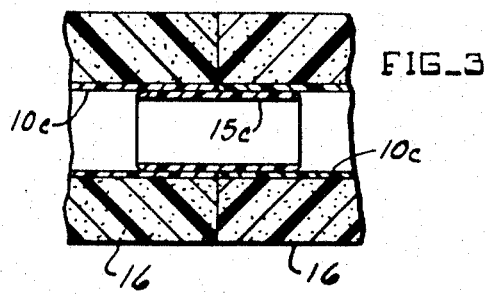
FIG_3
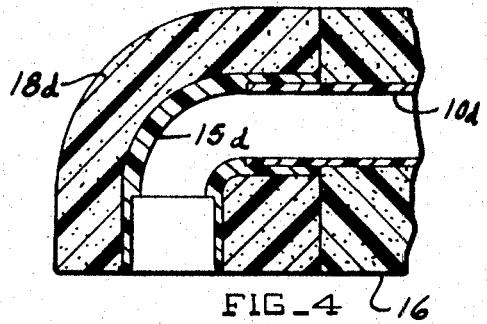
FIG_4
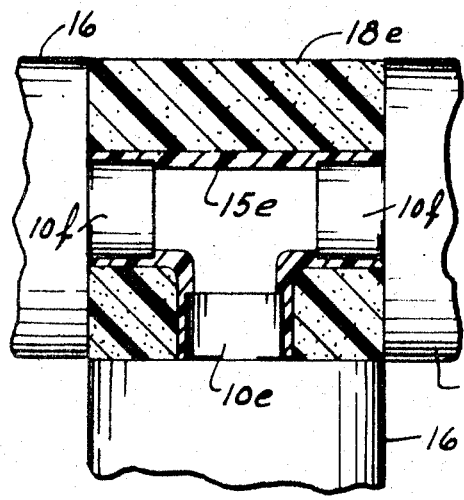
FIG_5
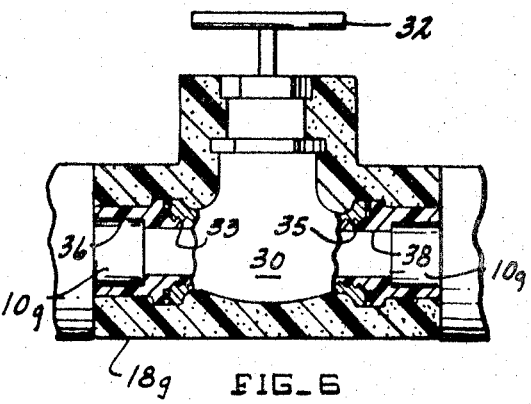
FIG_6
INVENTOR.
GEORGE MARTIN
BY Jefferson Ehrlich
ATTORNEYS United States Patent Office 3,463,691
Patented Aug. 26, 1969

3,463,691
METHOD FOR FORMING LIQUID HEAT EXCHANGE PIPING SYSTEM
George Martin, Louisville, Ky., assignor to American Standard Inc., a corporation of Delaware
Original application Aug. 11, 1965, Ser. No. 478,848, now Patent No. 3,402,731, dated Sept. 24, 1968. Divided and this application Jan. 22, 1968, Ser. No. 718,267
Int. Cl. B32b 31/20
U.S. Cl. 156—294                                 7 Claims

ABSTRACT OF THE DISCLOSURE

This invention provides means for interconnecting two pipes to each other, each of which is wrapped in foam insulation, the interconnection between the two pipes being made by connectors in such a manner as to obviate the necessity of applying insulation, or removing insulation, in the apparatus or during the interconnection procedure. By employing in-line connectors or T-type connectors, interconnection of the two pipes may be accomplished for conveying hot or cold liquids with a minimum of on-site labor and at a minimum cost.

---

This application is a division of application, Ser. No. 478,848, filed Aug. 11, 1965, entitled "Piping Systems and Methods of Assembling Same," now U.S. Patent No. 3,402,731.

This invention relates to piping systems for hot or cold liquids, as for example systems used to convey hot or chilled water from a central source (such as a boiler or water chiller) in homes or commercial buildings to individual room heat exchangers.

Such systems usually employ copper tubing, sometimes with sleeve type or wrap around insulation thereon. Insulation materials have included expanded foam materials such as polyurethane, and wrap-around mat materials such as fiberglass.

One drawback experienced with insulated copper tubing is the fact that soldering operations at the tube joints tend to thermally decompose the insulating material; the insulating material must therefore be removed, forced apart, or cut away from the tube ends during the soldering operations, thereby necessitating the application of additional insulating material to the joint areas after the soldering operations. This use of additional insulation requires two types of on-the-job labor, namely a plumber and an insulator.

An object of the present invention is to provide a piping system wherein pipes can be joined without the application of heat, and wherein the joining operations are performed without need for subsequently applying additional insulation over and above that which is on the piping as it comes from the factory.

Another object is to provide a piping system wherein the pipes are formed of plastic material having some thermal insulating characteristics, thereby permitting some reduction in the thickness of the insulating sleeves which fit around the pipe.

A general object is to provide a heat exchange liquid piping system having desired features of low material cost, good thermal insulating characteristic, good structural strength in the presence of high or low water temperatures and high water pressures, and low installation costs.

Other objects of this invention will appear from the following description and appended claims, reference being had to the accompanying drawings forming a part of this specification wherein like reference characters designate corresponding parts in the several views.

In the drawings:
FIGURE 1 is a sectional view illustrating one form which the invention may take;
FIG. 2 is a sectional view taken through another form of the invention;
FIG. 3 is a sectional view taken through a further form of the invention;
FIG. 4 is a sectional view through an additional form of the invention;
FIG. 5 is a sectional view taken through another embodiment of the invention; and
FIG. 6 is a view, partly in section, illustrating a further embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings there is shown a portion of a liquid heat exchange piping system comprising a plastic pipe 10, preferably formed of polyvinyl dichloride arranged with an end thereof telescoped into the tube portion 12 of a one-piece plastic connector member 15, also preferably formed of polyvinyl dichloride. Surrounding pipe 10 for substantially its entire length is a sleeve 16 of expanded foam insulation material, preferably polyurethane foam. The sleeve may be molded around pipe 10 as described generally in U.S. Patent 2,857,931, issued Oct. 28, 1958, to W. R. Lawton, entitled "Insulated Pipe and Method of Making the Same," or the sleeve may be preformed and slipped onto the pipe as a second operation, in which latter case a suitable solvent-type adhesive may be applied to the pipe to adhere the sleeve thereon.

Surrounding the connector member 15 is a jacket 18 of expanded foam insulation material, also preferably polyurethane foam. Jacket 18 and sleeve 16 are preferably applied to the respective connector member 15 and pipe 10, as by molding, at the factory. In the field an end portion of sleeve 16 can be trimmed off, leaving an exposed pipe portion 22 which can be coated with a suitable solvent-type adhesive, such as B. F. Goodrich A–1150–B, and then inserted into tube portion 12 in the general manner shown in U.S. Patent 2,498,831, issued Feb. 28, 1950, to F. J. Veitch, entitled "Pipe Joint."

It will be understood that a second plastic pipe 10a is telescoped into tube portion 12a of the connector member to form the complete conduit for the hot or cold heat exchange liquid. Shoulders 23 and 23a may be provided on the connector member to limit the telescoping movent to a point where the ends 25 of the insulating sleeves abut against the ends 26 of the jacket 18. Optionally, but not necessarily, a suitable insulation mastic, such as B. F. Goodrich A–1150–B may be applied to end surfaces 25 and 26 to adhere the insulating sleeves to the interposed insulating jacket. The essential adhesive is of course the adhesive between tube portions 12, 12a and pipe portions 22, 22a, these telescoping joints being necessarily liquid tight joints.

FIG. 2 illustrates an alternate pipe connector arrangement wherein the tube portions 12b fit within the end portions 22b of the pipes. In this arrangement there is no requirement for trimming off the end areas of the insulating sleeves 16 in the field, although of course the pipe-sleeve assembly may have to be sawed to an appropriate length to fit particular field dimensions. The FIG. 2 arrangement is somewhat disadvantageous in that the connector member offers some restriction to liquid flow; in small pipe sizes on the order of one inch the restrictions should be minimal for best results.

FIG. 3 illustrates a simplified pipe connector arrangement which dispenses with the need for an insulating jacket on the connector member. In this embodiment of the invention an end area of the connector member 15c is coated with adhesive, as by painting or spraying, after which the coated end is affixed within one of the plastic pipes 10c. Thereafter the exposed portion of member 15c is coated with adhesive and then inserted into the other pipe 10c to form the complete pipe system.

FIG. 4 illustrates an elbow type plastic connector member 15d which may be used to connect two plastic pipes 10d at right angles to one another. The connection procedure is similar to that described in connection with FIG. 1. As in FIG. 1, a jacket 18d is applied about the connector member.

FIG. 5 illustrates a T-type plastic connector member 15e usable to connect a plastic liquid supply pipe 10c with two plastic branch pipes 10f, the general connection procedure being similar to that described in the explanation of FIG. 1.

It will be understood that the male type connector principle shown in FIG. 2 may be applied to the elbow and T connector members shown in FIGS. 4 and 5.

FIG. 6 illustrates a connector means which includes a conventional brass body valve 30 having an operating handle 32 and threaded ports 33 and 35. The connector means is completed by two plastic tubes 36 and 38 which thread into the ports, and which form cylindrical sockets to receive the end portions of the plastic pipes 10g, suitable adhesive being applied to the outer surfaces of the pipes to provide liquid tight joints between the connector means and the two pipes. The connector means is preferably factory-coated with a jacket 18g of polyurethane foam, excepting only the operating handle 32 which is left uncoated for obvious operability reasons.

It will be seen that by using the factory-insulated plastic pipes and the various illustrated connectors shown in FIGS. 1 through 6 it is possible to build in the field a piping system having branches, valves, etc., all as required for any particular job. The on-the-job labor is fairly low because there are no soldering operations or in-the-field insulating operations.

As before noted, the plastic pipe are preferably formed of polyvinyl dichloride. This material has good structural strength in the presence of high or low water temperatures and high water pressures. Additionally it possesses some insulating value, thereby permitting some reduction in the thickness of the insulating sleeves.

Several specific embodiments of the invention have been illustrated, but it will be understood that the invention may be practiced in other forms without departing from the spirit thereof.

What is claimed:

1. A method of forming a liquid heat exchange piping system consisting of the steps of providing an insulating sleeve around each of two plastic pipes; forming a pipe-connecting means to include at least two plastic tubes; disposing an insulating jacket around the connecting means; applying adhesive to at least end portions of the plastic pipes or plastic tubes; and forcing the pipe ends onto the plastic tubes until the ends of the insulating sleeves substantially abut against the ends of the insulating jacket.

2. A method of forming a liquid heat exchange piping system consisting of the steps of proivding insulating sleeves around each of two plastic pipes; providing a liquid valve having an operating handle and two plastic tubes; disposing an insulating jacket around portions of the valve without interfering with operating movement of the handle; applying adhesive to at least end portions of the plastic pipes or plastic tubes; and forcing the pipe ends onto the plastic tubes until the ends of the sleeves substantially abut against the ends of the insulating jacket.

3. A method of forming a liquid heat-exchange piping system consisting of the steps of providing insulating sleeves around each of two plastic pipes; providing a pipe connecting means consisting of a one-piece plastic member having two plastic tubes formed integrally therewith; disposing an insulating jacket around the pipe-connecting means; applying adhesive to at least end portions of the plastic pipes or plastic tubes; and forcing the pipe ends onto the plastic tubes until the ends of the sleeves substantially abut against the ends of the insulating jacket.

4. The method of claim 1 wherein the pipe-connecting means is formed to include shoulders which limit movement of each pipe onto its respective plastic tube.

5. The method of claim 1, wherein the plastic tubes and pipes are formed of polyvinyl dichloride.

6. The method of claim 1, wherein the insulating sleeves and jacket are formed of polyurethane foam.

7. The method of forming a liquid heat exchange piping system consisting of the steps of factory-forming plastic pipes; factory-equipping the pipes with insulating sleeves; factory-forming pipe connectors to include plastic tubes; factory-molding expanded foam insulating jackets around the pipe connectors; applying adhesive to end portions of the plastic pipes or plastic tubes in the field, applying adhesive to the ends of the sleeves and jackets; and forcing the pipe ends onto the plastic tubes until the adhesive-coated ends of the insulating sleeves substantially abut against the adhesive-coated ends of the insulating jacket.

References Cited

UNITED STATES PATENTS

| 1,108,840 | 8/1914 | Franke | 285—47 X |
| 1,979,470 | 11/1934 | Johnston | 156—294 X |
| 3,022,209 | 2/1962 | Campbell | 285—292 X |
| 3,035,958 | 5/1962 | Wilkins | 156—294 |
| 2,739,829 | 3/1956 | Pedlow et al. | 156—294 X |
| 3,307,590 | 3/1967 | Carlson | 138—149 |
| 3,387,864 | 6/1968 | Walters | 285—292 X |
| 3,394,952 | 7/1968 | Garrett | 285—292 X |
| 3,394,953 | 7/1968 | Landon | 285—423 X |
| 3,397,720 | 8/1968 | Jones | 285—47 X |

HAROLD ANSHER, Primary Examiner

U.S. Cl. X.R.

137—375; 138—141, 149; 285—47, 292, 423